US008257160B2

(12) United States Patent
Jaffe

(10) Patent No.: US 8,257,160 B2
(45) Date of Patent: Sep. 4, 2012

(54) WAGERING GAME WITH MODIFIED AWARD EXPECTED VALUE

(75) Inventor: Joel R. Jaffe, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 875 days.

(21) Appl. No.: 11/901,614

(22) Filed: Sep. 18, 2007

(65) Prior Publication Data

US 2009/0075717 A1 Mar. 19, 2009

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................ 463/20; 463/16; 463/25; 463/40; 463/42; 273/143 R; 273/236; 273/269; 700/91; 700/93

(58) Field of Classification Search ................ 463/9–13, 463/16–23, 25–26, 29, 30–34, 35, 36, 40–42; 273/139, 143 R, 236–237, 269, 292–293, 273/307, 459–461; 340/323 R; 700/91–93
See application file for complete search history.

(56) References Cited

U.S. PATENT DOCUMENTS

| | | | | |
|---|---|---|---|---|
| 5,494,287 | A * | 2/1996 | Manz | 273/143 R |
| 5,743,800 | A * | 4/1998 | Huard et al. | 463/26 |
| 5,902,184 | A * | 5/1999 | Bennett | 463/13 |
| 6,234,896 | B1 | 5/2001 | Walker et al. | 463/16 |
| 6,517,433 | B2 | 2/2003 | Loose et al. | 463/20 |
| 6,569,013 | B1 * | 5/2003 | Taylor | 463/13 |
| 6,719,632 | B2 * | 4/2004 | Palmer et al. | 463/25 |
| 6,780,109 | B2 * | 8/2004 | Kaminkow | 463/20 |
| 6,893,342 | B1 * | 5/2005 | Singer et al. | 463/20 |
| 7,147,559 | B2 * | 12/2006 | Englman | 463/25 |
| 7,192,345 | B2 | 3/2007 | Muir et al. | 463/20 |
| 2004/0072618 | A1 * | 4/2004 | Bartholomew et al. | 463/42 |
| 2006/0128456 | A1 * | 6/2006 | Berman et al. | 463/13 |
| 2006/0128467 | A1 * | 6/2006 | Thomas | 463/31 |
| 2006/0142077 | A1 * | 6/2006 | Miles et al. | 463/20 |
| 2009/0042652 | A1 * | 2/2009 | Baerlocher et al. | 463/42 |

* cited by examiner

*Primary Examiner* — Melba Bumgarner
*Assistant Examiner* — Jason Pinheiro
(74) *Attorney, Agent, or Firm* — Nixon Peabody LLP

(57) ABSTRACT

A gaming machine for playing a wagering game includes a wager input device for receiving a wager to play a wagering game. The gaming machine further includes a display arrangement that is in communication with a controller. The display arrangement displays a plurality of positions and a range of awards associated with each of the symbol position. The controller is programmable to successively populate the plurality of positions with respective symbols, and, in response to the symbol at any of the plurality of positions being a special award symbol, provide an award randomly selected from the range associated with that position, and modify an expected value of the award randomly selected from the range as a result of each subsequent occurrence of the special award symbol.

17 Claims, 13 Drawing Sheets

WAGERING GAME WITH MODIFIED AWARD EXPECTED VALUE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a wagering game having an award expected value that is modified based on a subsequent occurrence of a special award symbol.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Recent advances in video display technology have made it possible to more easily modify the appearance of a display to show a superimposed video image. For example, the superimposed video image can be provided by either a transmissive display or a half-mirror arrangement. Referring to the transmissive display, it is essentially a transparent video display that is superimposed over a mechanical display. The transmissive display is then operated to display selected video images superimposed over the mechanical display. The video images may include translucent portions so that the underlying mechanical display is visible, but in an altered state (i.e., different color, texture, etc.). The video images may also include opaque portions so as to completely block out the underlying mechanical display. For information regarding the use of transmissive display technology in gaming machines and for embodiments employing transmissive displays, the reader is referred to commonly-assigned U.S. Published Application No. 20040198485, titled "Gaming Machine with Superimposed Display Image," filed on Nov. 7, 2003, and to commonly-assigned U.S. Pat. No. 6,517,433, titled "Reel Spinning slot Machine With Superimposed Video Image," issued on Feb. 11, 2003, each of which being incorporated herein by reference in its entirety.

The above-described video overlay technology gives wagering game designers the capability and flexibility to more easily design and modify the appearance of mechanical displays. Accordingly, there is a need to develop new and improved wagering games for displays using this technology, with features that take full advantage of the capabilities of video overlay technology, such as transmissive displays, to thereby enhance the entertainment value of the wagering games.

SUMMARY OF THE INVENTION

According to one embodiment, a gaming machine for playing a wagering game includes a wager input device for receiving a wager to play a wagering game. The gaming machine further includes a display arrangement that is in communication with a controller. The display arrangement displays a plurality of positions and a range of awards associated with each of the symbol position. The controller is programmable to successively populate the plurality of positions with respective symbols, and, in response to the symbol at any of the plurality of positions being a special award symbol, provide an award randomly selected from the range associated with that position, and modify an expected value of the award randomly selected from the range as a result of each subsequent occurrence of the special award symbol.

According to another embodiment, a method of conducting a wagering game includes receiving a wager input from a player for playing the wagering game. A randomly selected outcome is selected during the play of the wagering game, the randomly selected outcome being selected from a plurality of outcomes including a start-bonus game outcome. A bonus game is triggered in response to selecting the start-bonus game outcome, the bonus game including a plurality of free spins. The plurality of positions are successively populated with respective symbols during each free spin of the plurality of free spins. In response to each occurrence of one or more occurrences of a special award symbol during a free spin of the plurality of free spins, an award outcome and a default variable pay range are displayed. An award that is randomly selected from the default variable pay range is awarded. The default variable pay range is changed to a modified variable pay range based on each subsequent occurrence of the special award symbol.

According to yet another embodiment, a method of conducting a wagering game includes receiving a wager to play the wagering game. A plurality of positions and a range of awards associated with each of the symbol positions are displayed. The plurality of positions are successively populated with respective symbols. In response to the symbol at any of the plurality of positions being a special award symbol, the method further includes awarding an award that is randomly selected from the range associated with that position, and modifying an expected value of the award randomly selected from the range as a result of each subsequent occurrence of the special award symbol.

Additional aspects of the invention will be apparent to those of ordinary skill in the art in view of the detailed description of various embodiments, which is made with reference to the drawings, a brief description of which is provided below.

DETAILED DESCRIPTION

Figure 1:
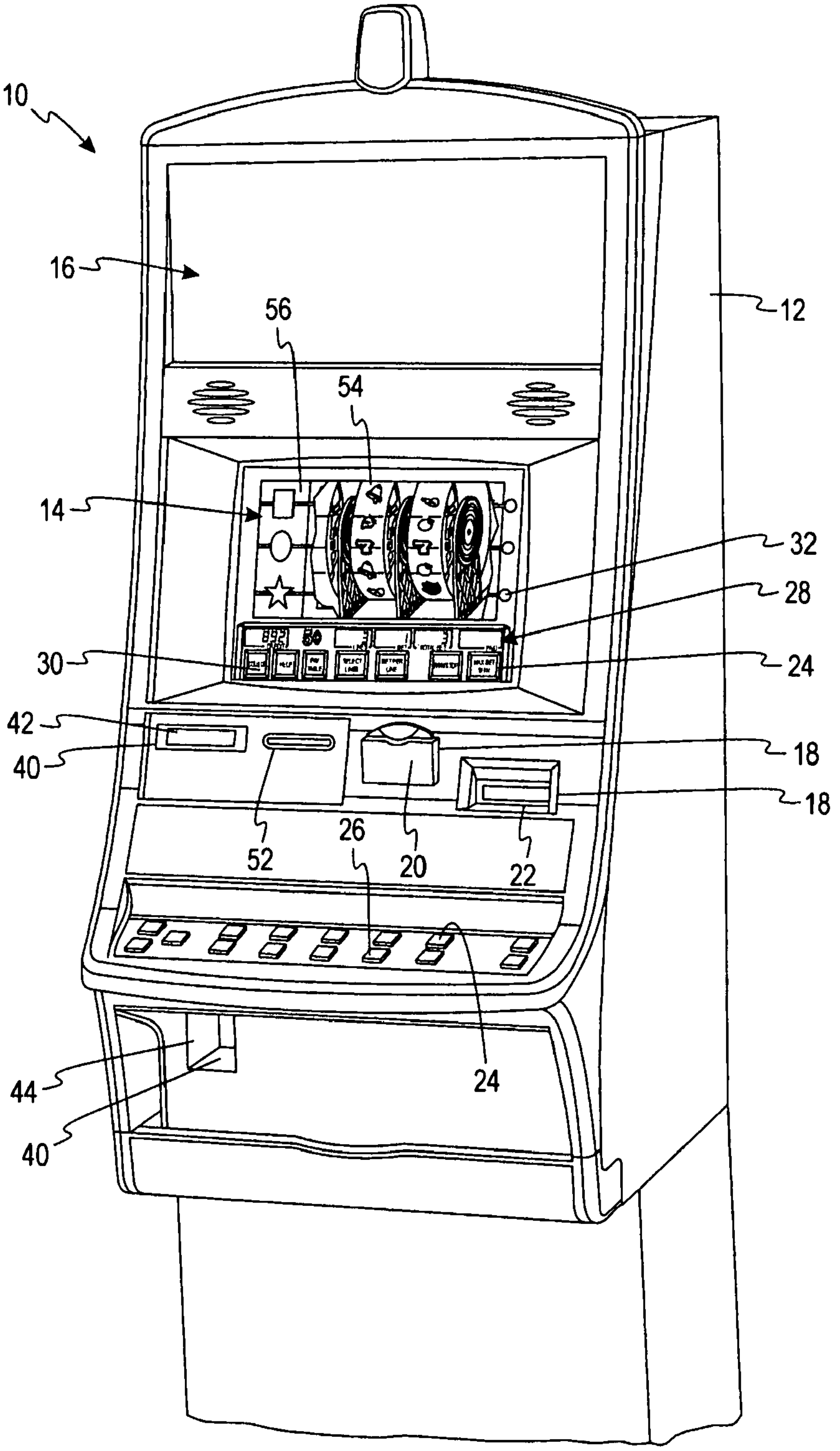
FIG. 1 is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a mechanical reel gaming machine 10 similar to those used in gaming establishments, such as casinos, is shown. The gaming machine 10 comprises a housing 12 and a number of input devices, including a value input device 18 and a player input device 24. For outputs, the gaming machine 10 comprises a primary display area 14 for displaying information about base wagering games and a secondary display area 16 for displaying game events, game outcomes, and/or signage information. The primary display area 14 and/or secondary display area 16 may also display information about bonus wagering games and progressive wagering games. In accordance with embodiments of the invention, the primary display area 14 comprises a plurality of mechanical reels 54 and a transmissive display 56 superimposed over the mechanical reels 54. Each of the foregoing components is described in more detail below. While the exemplary embodiments described below refer to the mechanical reels 54, in other embodiments the mechanical reels 54 can be replaced with video reels 54' (see FIG. 3). Thus, alternatively, the primary display area 14 can include the transmissive display 56 being superimposed over a plurality of video reels 54.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency. Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like on the primary display area 14 (over the transmissive display 56) and/or on secondary display area 16. The touch screen 28 contains soft touch keys 30 denoted by graphics on the underlying primary display area 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

A player begins play of the base wagering game by making a wager via the value input device 18 of the gaming machine 10. A player can select play by using the player input device 24, via the buttons 26 or the touch screen keys 30. The base game consists of a plurality of symbols arranged in an array, and includes at least one payline 32 that indicates one or more outcomes of the base game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display area 16 or other dedicated player-tracking display for providing the player with information about his or her account or other player-specific information. Also, in some embodiments, the information reader 52 may be used to restore game assets that the player achieved and saved during a previous game session.

In the illustrated embodiment, the gaming machine 10 is an "upright" version in which the primary display area 14 is oriented vertically relative to the player. Alternatively, the gaming machine may be a "slant-top" version in which the primary display area 14 is slanted at about a thirty-degree angle toward the player of the gaming machine 10. Furthermore, although only three mechanical reels are shown in the primary display area 14, those having ordinary skill in the art will recognize that the gaming machine 10 may comprise fewer or more mechanical reels (e.g., four reels, five reels, etc.), depending on the particular configuration of the primary display area 14.

Figure 2A:
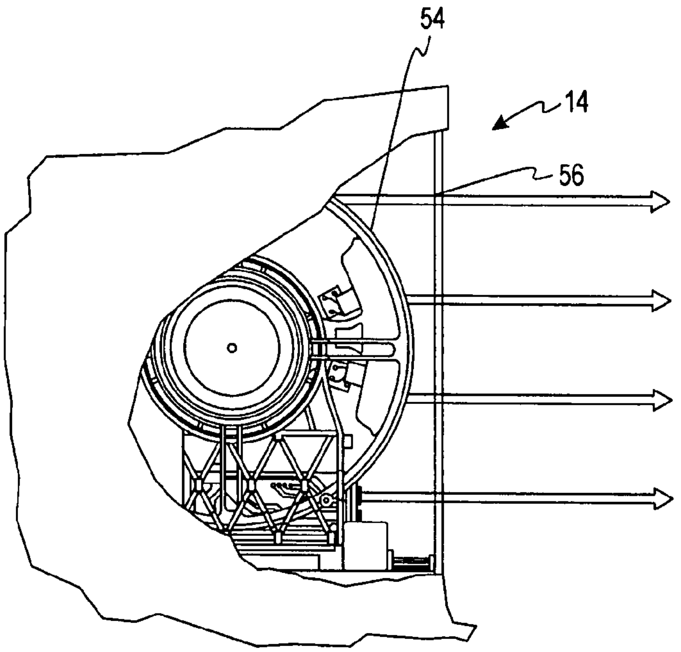
FIGS. 2*a*-2*b* are cross-sectional side views of a display area embodying the present invention.
Figure 2B:
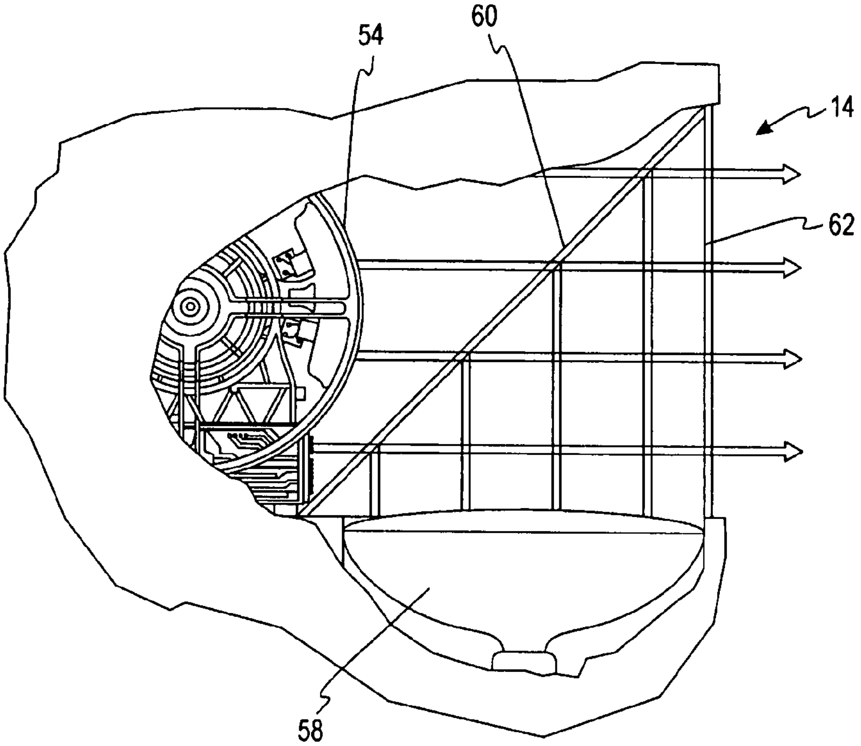

FIGS. 2*a*-2*b* illustrate exemplary implementations of the primary display area 14 in which a video image is superimposed over the mechanical reels 54. Although not expressly labeled, each reel of the mechanical reels 54 has a plurality of reel symbols (see FIG. 1) that represent a randomly-selected outcome of the wagering game. The video image may then be positioned over the mechanical reels 54 to enhance and/or alter the appearance (e.g., color, texture, etc.) of the mechanical reels 54. There are at least two possible configurations for the primary display area 14: a direct image configuration (FIG. 2*a*), and a virtual image configuration (FIG. 2*b*). These configurations are described below.

Referring to FIG. 2*a*, in the direct image configuration, a transmissive display 56 is positioned directly in front of the mechanical reels 54 and generates a direct image. In such an arrangement, the transmissive display 56 may be a flat panel transmissive video display, for example, a transmissive liquid crystal display (LCD) commercially available from LG Phillips LCD Co., Ltd., of Seoul, Korea, Sharp Electronics Corp. of Tokyo, Japan, and other display manufacturers. The flat panel transmissive video display is preferably preconfigured with the touch screen 28 (see FIG. 1) mounted to a front surface of the display.

In the virtual image configuration, shown in FIG. 2*b*, a reflected video image is used instead of a direct image. In such an arrangement, the reflected video image may be generated by, for example, a standard video display 58 and a partially reflective mirror 60. The standard video display 58 may be mounted below the mechanical reels 54 and substantially normal thereto, and the partially reflective mirror 60 may be positioned over the mechanical reels 54 at a predetermined angle (e.g., 45 degrees). Video images from the standard video display 58 are then reflected off the partially reflective mirror 60 so that they appear to a player to be superimposed over the mechanical reels 54. The standard video display 58 may be any suitable video projection display known to those having ordinary skill in the art, including a CRT, LCD, dot matrix, LED, electro luminescent, and the like. In some embodiments, the primary display area 14 further comprises a transparent glass cover/window 62 positioned over the partially reflective mirror 60 to protect the mirror 60. Such a cover/window 62 may be optionally configured with the touch screen 28 for receiving player input.

The superimposed video images may be selectively made transparent, semi-transparent (i.e., translucent), or opaque in selected places. This allows preselected images to be displayed over certain portions of the primary display area 14, with the result that certain areas of the primary display area 14 are either altered in some way (e.g., highlighted, colored, etc.), or completely blocked by the superimposed images. All video images superimposed on the primary display area 14 may be rendered in two-dimensional (e.g., using Flash Macromedia™) or three-dimensional graphics (e.g., using Renderware™). The images may be played back (e.g., from a recording stored on the gaming machine 10), streamed (e.g., from the gaming network), or received as a TV signal (e.g., either broadcast or via cable). The images may be animated, or they may be real-life images, either prerecorded (e.g., in the case of marketing/promotional material) or as live footage, and the format of the video images may be an analog format, a standard digital format, or a high-definition (HD) digital format. Using superimposed video images in this way allows numerous types of improvements and enhancements to be made to the appearance of the primary display area 14 in real time and during on-going game play.

Figure 3:
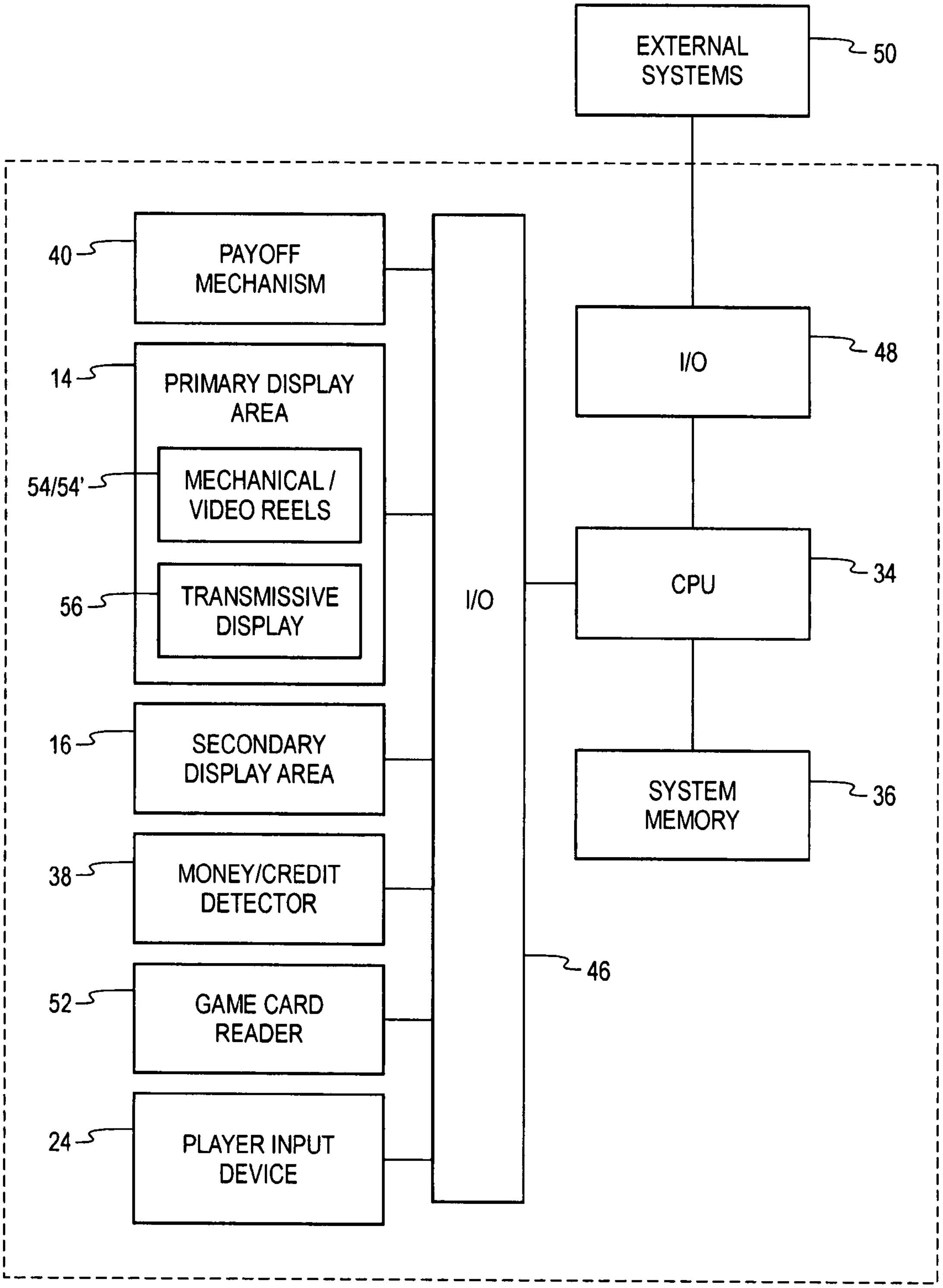
FIG. 3 is a block diagram of a control system suitable for operating the gaming machine of FIG. 1.

Turning now to FIG. 3, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10, but may be located outboard of the housing 12 and connected to the remainder of the components of the gaming machine 10 via a variety of different wired or wireless connection methods.

As seen in FIG. 3, the controller 34 is also connected to, and controls, the primary display area 14, the player input device 24, and a payoff mechanism 40. The primary display area 14 in this embodiment uses the transmissive display 56 to superimpose a video image over the mechanical/video reels 54/54', but a reflected image arrangement (see FIG. 2*b*) may also be used in other embodiments. The payoff mechanism 40 is operable in response to instructions from the controller 34 to award a payoff to the player in response to certain winning outcomes that might occur in the base game or the bonus game(s). The payoff may be provided in the form of points, bills, tickets, coupons, cards, and the like. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, and the like. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 3, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10.

By virtue of the superimposed video images, a variety of traditional as well as visually-enhanced wagering games involving the mechanical reels 54 may be played on the gaming machine 10. These wagering games may be provided to the gaming machine 10 using any suitable means known to those having ordinary skill in the art, including hardware upgrades as well as direct downloads via external systems 50. In the latter case, the gaming machine 10 may communicate with the external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. Numerous alternative configurations are possible such that the aforementioned and other functions may be performed onboard or external to the gaming machine 10 as may be necessary for particular applications.

Thus far, the transmissive display 56 has only been described as being part of the primary display area 14. It is also possible, however, to position the transmissive display 56 in the secondary display area 16 as well without departing from the scope of the invention. Still, in most embodiments, the primary display area 14 is the one with the transmissive display 56 being directly positioned to generate a direct image. The reason for this is because in gaming machines 10 that involve the transmissive display 56, the primary display area 14 is the display (most of the time) that includes mechanical reels (e.g., for a slot machine), a mechanical wheel (e.g., a roulette game), one or more dice, a pachinko board, or other board game. In alternative embodiments, however, the primary display area 14 may include video reels 54' by using a video display such as a CRT or LCD. In further alternative embodiments, the primary display area 14 may include a diorama presenting a three-dimensional model of a game environment. The diorama may be stationary in some implementations, or it may slide or move around in one or more dimensions.

Figure 4A:
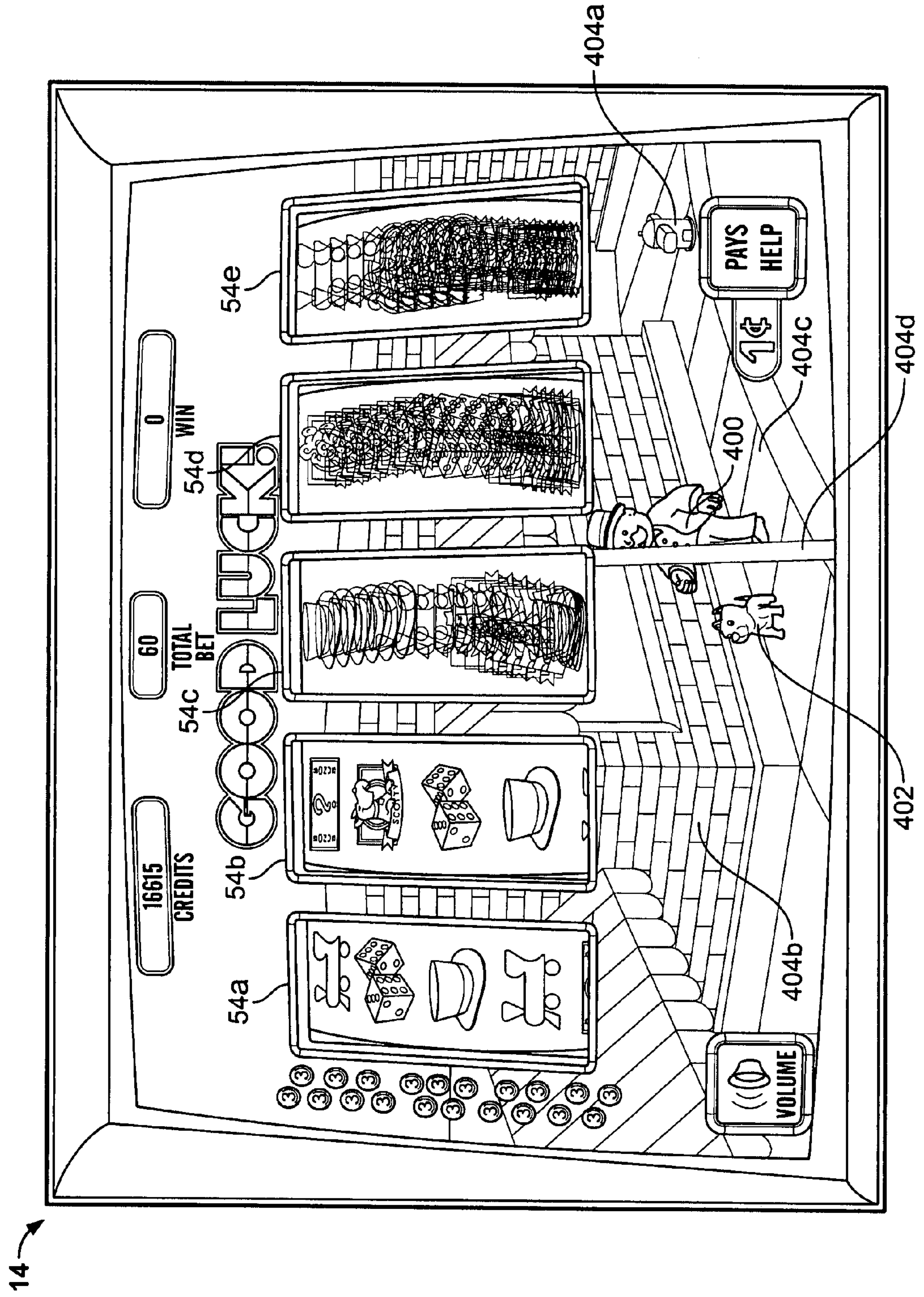
FIG. 4*a* is a game-display representation showing a scrolling scene while a number of reels are spinning.
Figure 4B:
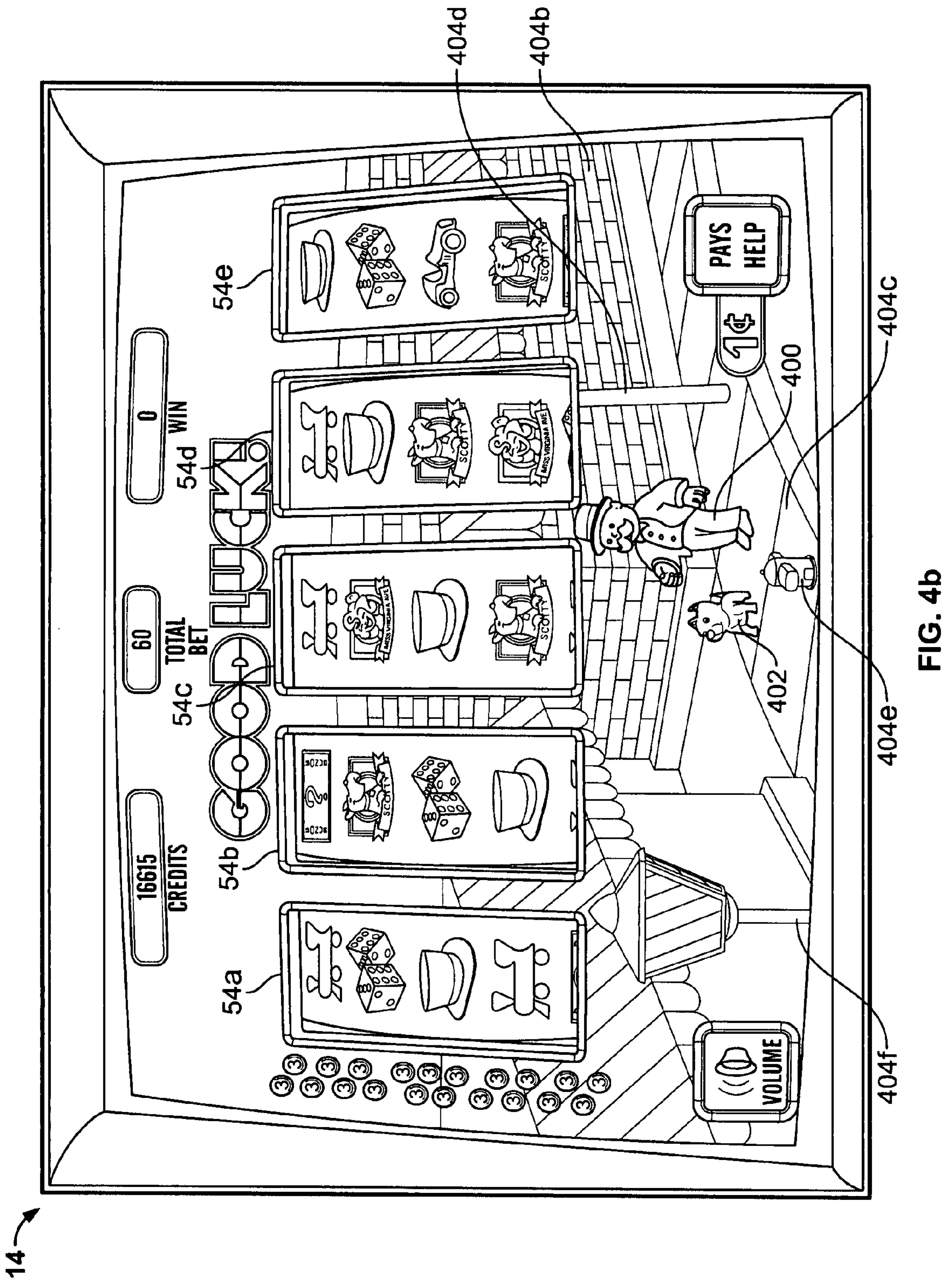
FIG. 4*b* shows the scrolling scene after all the reels have stopped spinning.
Figure 4C:
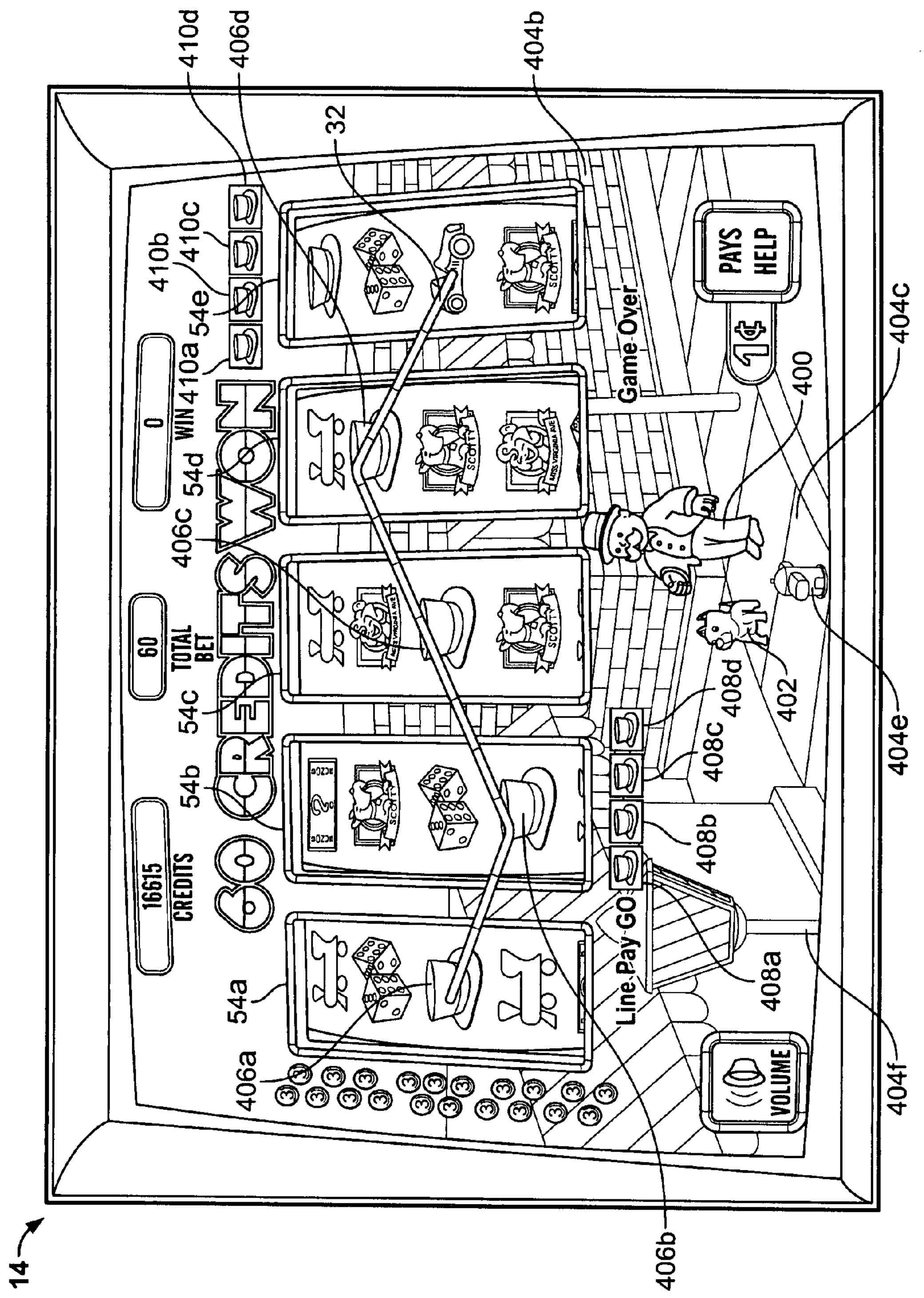
FIG. 4*c* shows the scrolling scene after a winning outcome has been identified.

Referring to FIGS. 4*a*-4*c*, the primary display area 14 shows a scrolling scene at different time instances during an exemplary reel wagering game. The scrolling scene is preferably depicted on the superimposed video image described above in reference to FIGS. 2*a*-2*b*. A first time instance, shown in FIG. 4*a*, shows the primary display area 14 having a plurality of reels 54*a*-54*e*, a Mr. Monopoly character 400, a dog character 402, and various scenery elements, including a fire hydrant 404*a*, a brick building 404*b*, a sidewalk 404*c*, a pole 404*d*, etc. A randomly selected outcome is displayed on the primary display area 14 when all the reels 54*a*-54*e* have stopped spinning. The characters 400-402 and scenery elements 404*a*-404*d* are all shown on the superimposed video image, over the reels 54*a*-54*e* (e.g., which can be mechanical reels).

Mr. Monopoly 400 is walking the dog 402 through a neighborhood, which is represented by the various scenery elements 404*a*-404*d*. At least one of Mr. Monopoly 400 and the dog 402 are moving through the neighborhood during the spinning of at least one of the reels 54*a*-54*e*. Thus, the movement of Mr. Monopoly 400 through the neighborhood, which is formed by scenery elements 404*a*-40*c*, creates a scrolling scene that occurs during the spinning of the reels 54*a*-54*e*. In one embodiment, Mr. Monopoly 400 and the dog 402 are merely walking around the same block over and over again with no changes in the scenery. In an alternative embodiment, random or predetermined changes may gradually be introduced into the scrolling scene to show different scenery. For example, some changes may include changing day to night, rain to sun, winter to spring, etc. In other examples, Mr. Monopoly 400 and/or the dog 402 may engage in various antics as they walk, such as the dog 402 doing different tricks, chasing cars, bringing a newspaper, eating a steak, barking at pedestrians, playing with other dogs or children, etc. In alternative embodiments, any animated feature (such as the exemplary characters 400, 402 described above) can be used to display a scrolling scene.

As shown in FIG. 4*a*, a first reel 54*a* and a second reel 54*b* have stopped spinning, while the last three reels 54*c*-54*e* are still spinning. The superimposed video image shows Mr. Monopoly 400 as being slightly behind the pole 404*d*, walking on the sidewalk 404*c* next to the brick building 404*b*. The fire hydrant 404*a* is behind Mr. Monopoly 400. The dog 402 is walking in front of Mr. Monopoly 400.

A second time instance of the superimposed video image, shown in FIG. 4*b*, shows that Mr. Monopoly 400 and the dog 402 are now in a different location of the neighborhood when all the last three reels 54*c*-54*e* (which are not part of the superimposed video image) have stopped spinning. Specifically, Mr. Monopoly 400 and the dog 402 have advanced on the sidewalk 404*c* and are now in front of the pole 404*d*, near a second fire hydrant 404*e*. Also, a second pole 404*f* is now in view.

A third time instance, shown in FIG. 4*c*, shows the randomly selected outcome, which includes four hat symbols 406*a*-406*d* aligned along the payline 32. Optionally, the movement of Mr. Monopoly 400 changes when the randomly selected outcome is displayed. For example, before the randomly selected outcome is displayed, Mr. Monopoly 400 is simply walking casually through the neighborhood. When the randomly selected outcome is displayed, in full, to show a winning outcome, Mr. Monopoly 400 stops walking and waives his arms in the air or claps his hands to signal rejoicing for the winning outcome. Similarly, the animation of the dog 402 can change from walking to jumping and barking. In another example, the dog 402 interacts with Mr. Monopoly 400 by jumping in his arms to indicate happiness that the player has received a winning outcome. In alternative embodiments, the animated characters 400, 402 can perform any special animation when the player achieves a winning outcome.

Although the above description refers generally to a base game of the wagering game, the scrolling scene can be displayed during other events displayed on the primary display area 14. For example, the scrolling scene can also be displayed during an attract mode (e.g., a demonstrational display of the wagering game), between reel spins of the base game, and/or a bonus game such that the scrolling scene is continuously displayed except when the superimposed video image is used for a different purpose, such as to present a pay table, a help screen, or a special game feature. Further, the scrolling scene can be additionally or alternatively displayed on other displays of the gaming machine 10, including the secondary display area 16.

In one embodiment, a superimposed video image shows winning symbol combinations that are duplicated on the primary display area 14 to help a player easily understand why he or she has won. In the example of FIG. 4*c*, the player has achieved a winning symbol combination because four hat symbols 406*a*-406*d* are aligned along payline 32. The four hat symbols 406-406*d* are shown on an underlying screen of the primary display area 14 (e.g., on respective reels of a plurality of mechanical reels). However, because there are so many other symbols next to the hat symbols 406*a*-406*d*, the player may not easily recognize the reason for the winning combination. Accordingly, four bottom duplicative symbols 408*a*-408*d* are shown as video images superimposed over, and below, the reels 54*a*-54*e*. Alternatively or additionally, four top duplicative symbols 410*a*-410*d* are shown as video images superimposed over, and above, the reels 54*a*-54*e*.

Duplicative symbols 408*a*-408*d*, 410*a*-410*d* can be shown, for example, on a transmissive video display, such as the transmissive display 56 described above in reference to FIGS. 2*a*-2*b*. Optionally, one or more of the duplicative symbols 408*a*-408*d*, 410*a*-410*d* may be a dynamic symbol that changes based on the randomly selected outcome. For example, if a wild multiplier symbol contributes to a winning symbol combination, a duplicative wild multiplier symbol may slowly increases in size to visually indicate the award increase. In another example, one or more duplicative symbols may change in size relative to one another. Referring to the bottom duplicative symbols 408*a*-408*d*, a second bottom duplicative symbol 408*b* may be larger than a first bottom duplicative symbol 408*a*, a third bottom duplicative symbol 408*c* may be larger than the second bottom duplicative symbol 408*b*, and a fourth bottom duplicative symbol 408*d* may be larger than the third bottom duplicative symbol 408*c*. In alternative embodiments, other changing characteristics can be used, including shape, color, etc.

Figure 5:
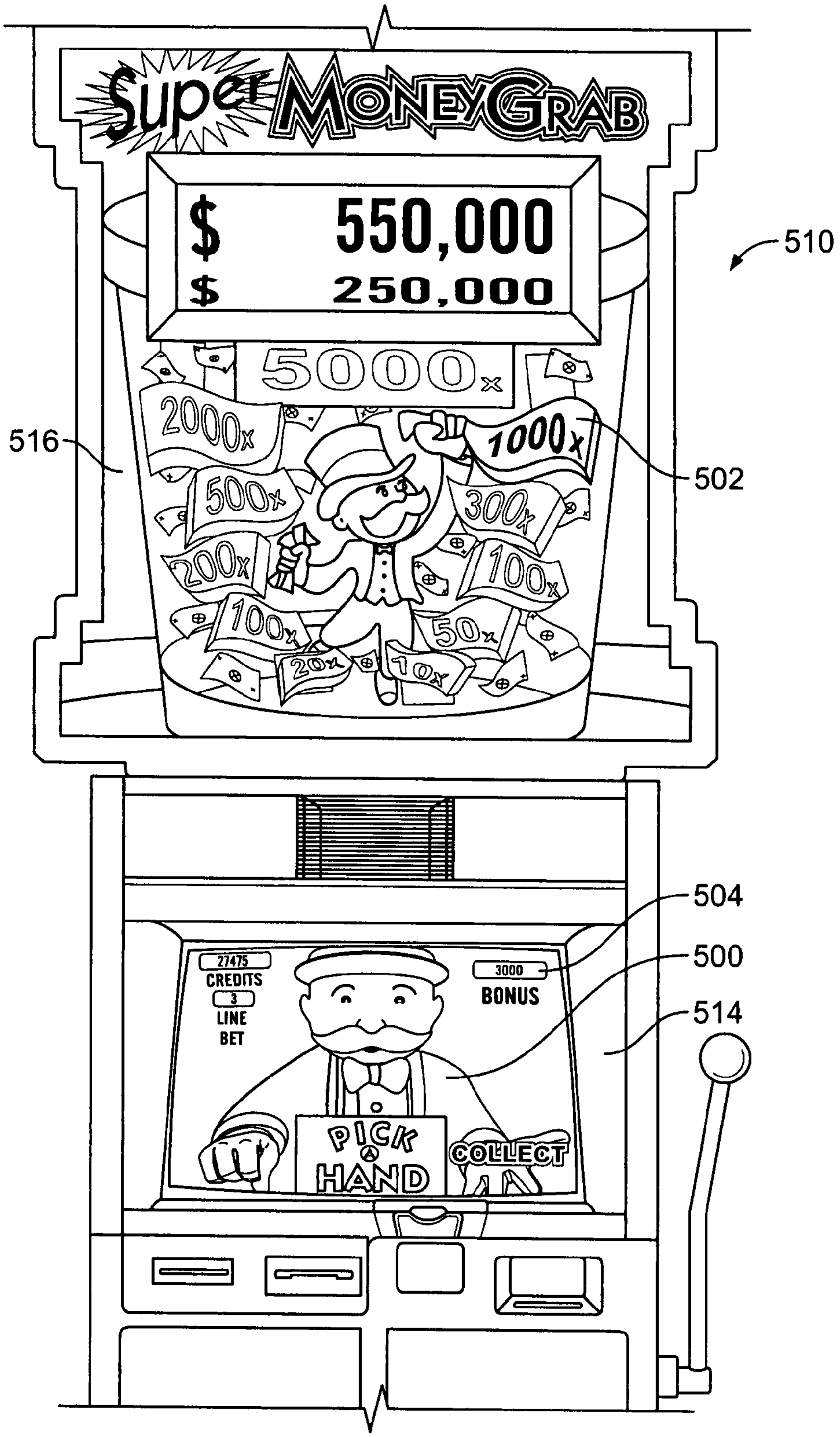
FIG. 5 is a front view of a gaming machine having a top box and displaying a bonus game.

Referring to FIG. 5, a gaming machine 510 includes a primary display area 514 and a secondary display area 516 for playing one or more bonus games. The secondary display area 516 is part of a top box of the gaming machine 510, and includes plurality of lights 502 that flash randomly when a feature is selected on the primary display area 514. The lights 502 are each associated with a respective bonus award. For example, the bonus awards can be multiplier awards ranging from 10× to 5,000× multiplied by the player's initial line bet.

In response to a triggering condition, a "Chance" bonus game is displayed in the primary display area 514. For example, the "Chance" bonus game can be triggered when three or more "Chance" cards, in the form of reel symbols, land along a payline (such as payline 32 displayed in FIG. 4*c*). The "Chance" cards are displayed on mechanical or video reels of the primary display area 514. If the "Chance" cards land along the payline, a superimposed video image of a number of "Chance" cards are displayed for player selection. The player selects one of the "Chance" cards by touching the respective "Chance" card. The player selection of the "Chance" card may be done by simply touching a touch screen of the primary display area 514. In response, the selected "Chance" card triggers, for example, a top box bonus game.

If the player-selected "Chance" card reveals the top box bonus, the player watches as one or more lights 502 in the top box of the gaming machine 510 flash randomly until they come to a stop and award a bonus award. As shown, a 1000× multiplier award has been randomly awarded. Assuming that the player had initially wagered 3 credits per line to play the base game, the multiplier award would result in a credit award of 3,000 credits, which is indicated in a bonus award window 504. Optionally, when Mr. Monopoly 500 reveals what is in the selected hand, the selected feature is displayed as text imprinted on a coin.

After the bonus award has been awarded, the player selects a hand of a Mr. Monopoly character 500. The Mr. Monopoly character 500 is displayed as a superimposed video image on the primary display area 514. Both hands of Mr. Monopoly 500 are initially closed, obscuring from player's view a feature selection. As shown, the player has selected the left hand of Mr. Monopoly 500. Mr. Monopoly 500 opens his left hand and reveals a "Collect" instruction. If the player selects the "Collect" feature, the top box bonus game ends and the player may collect his or her award. Alternatively, if Mr. Monopoly 500 reveals a "Continue" instruction, an additional bonus award is awarded from the top box. An optional instructional window may appear in the primary display area 514 to instruct the player to "Look Up" to view his or her award. Optionally, winning bonus awards remain lit. Thus, according to one embodiment, the longer the bonus lasts, the better the odds of winning one of the larger bonus awards. Optionally yet, no bonus awards are repeated on the top box (e.g., there is only one "2000×" multiplier bonus award).

Figure 6A:
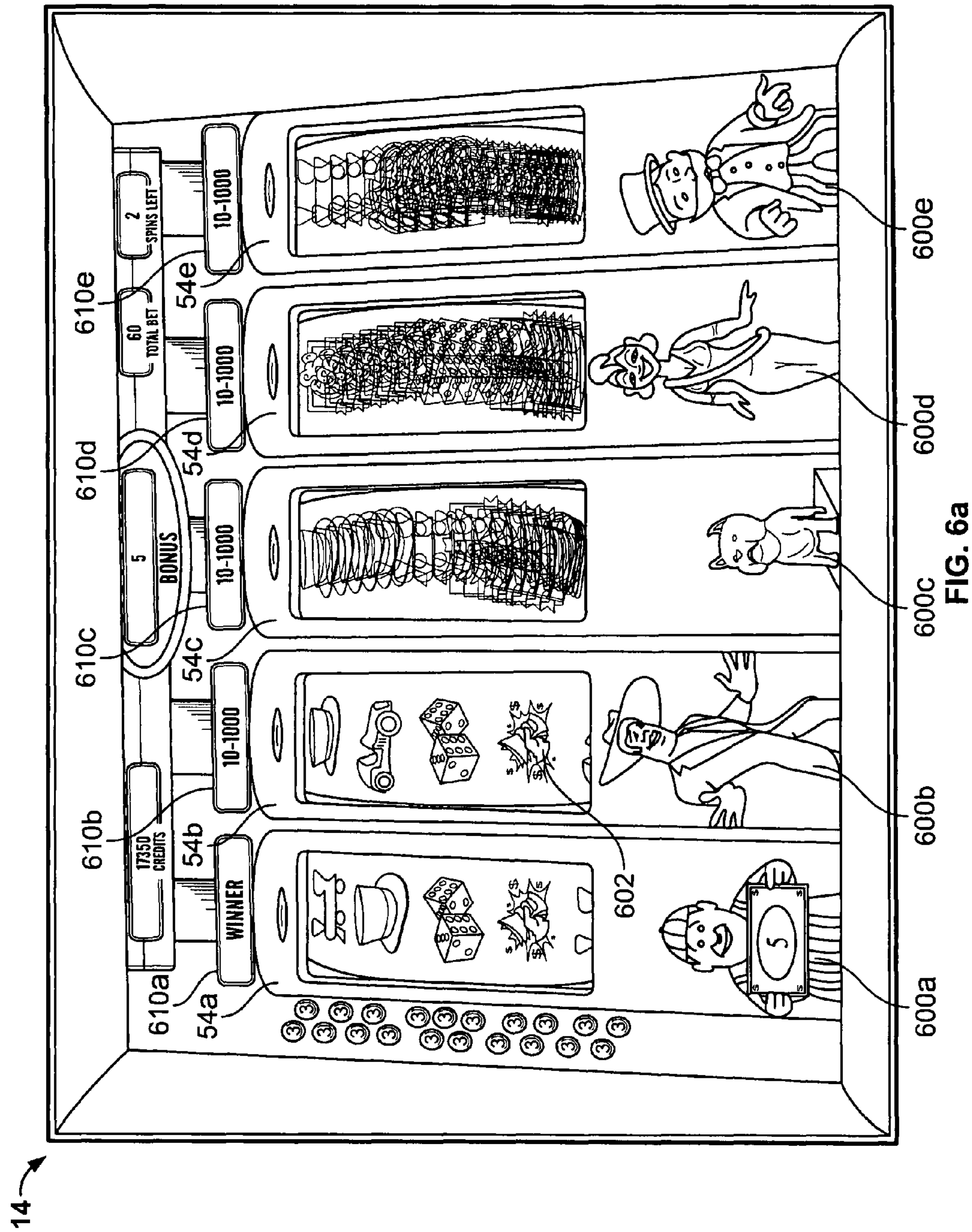
FIG. 6*a* is a game-display representation showing a bonus-triggering symbol displayed on a stopped reel and an interactive character below the stopped reel.
Figure 6B:
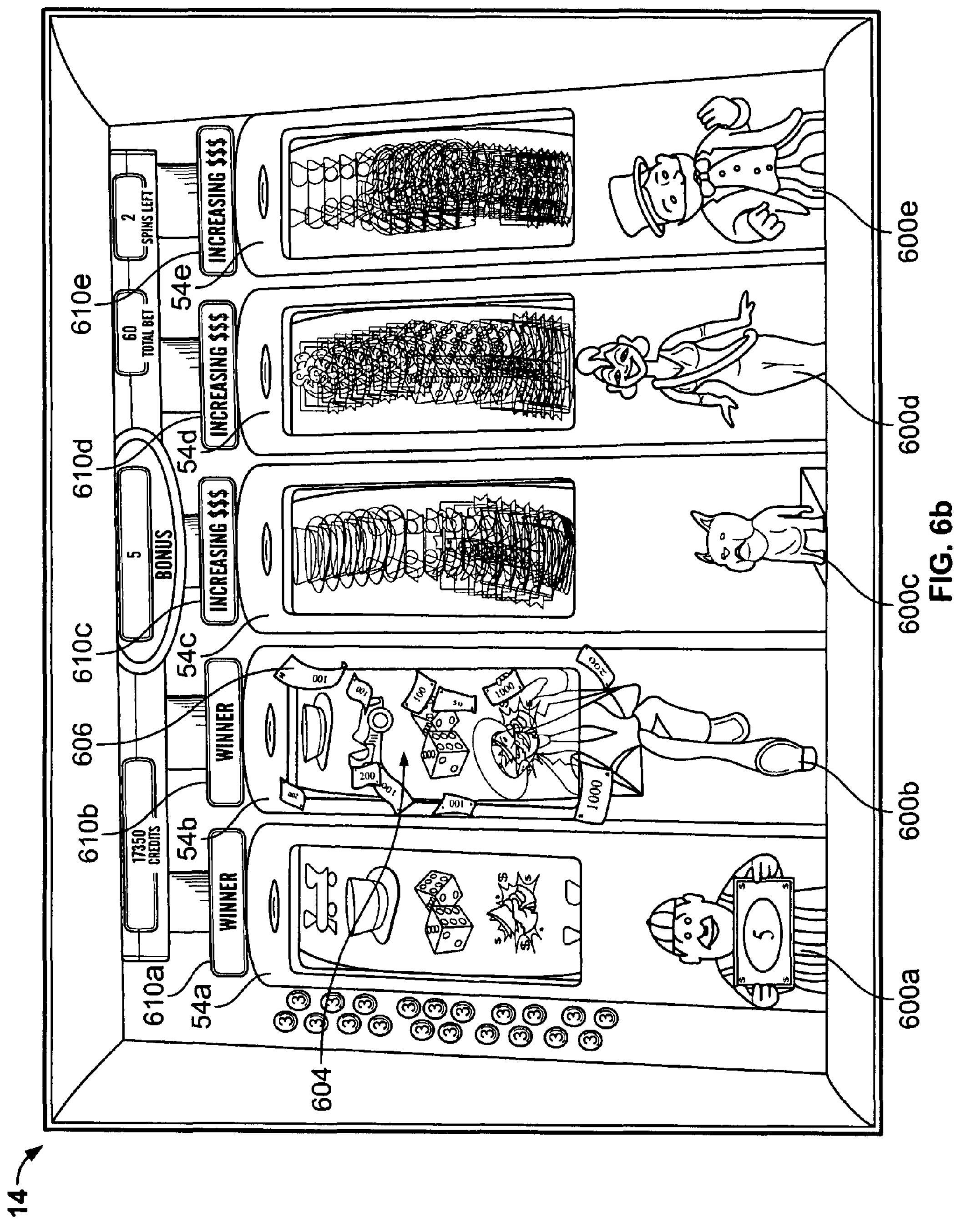
FIG. 6*b* shows the interactive character interacting with the stopped reel.
Figure 6C:
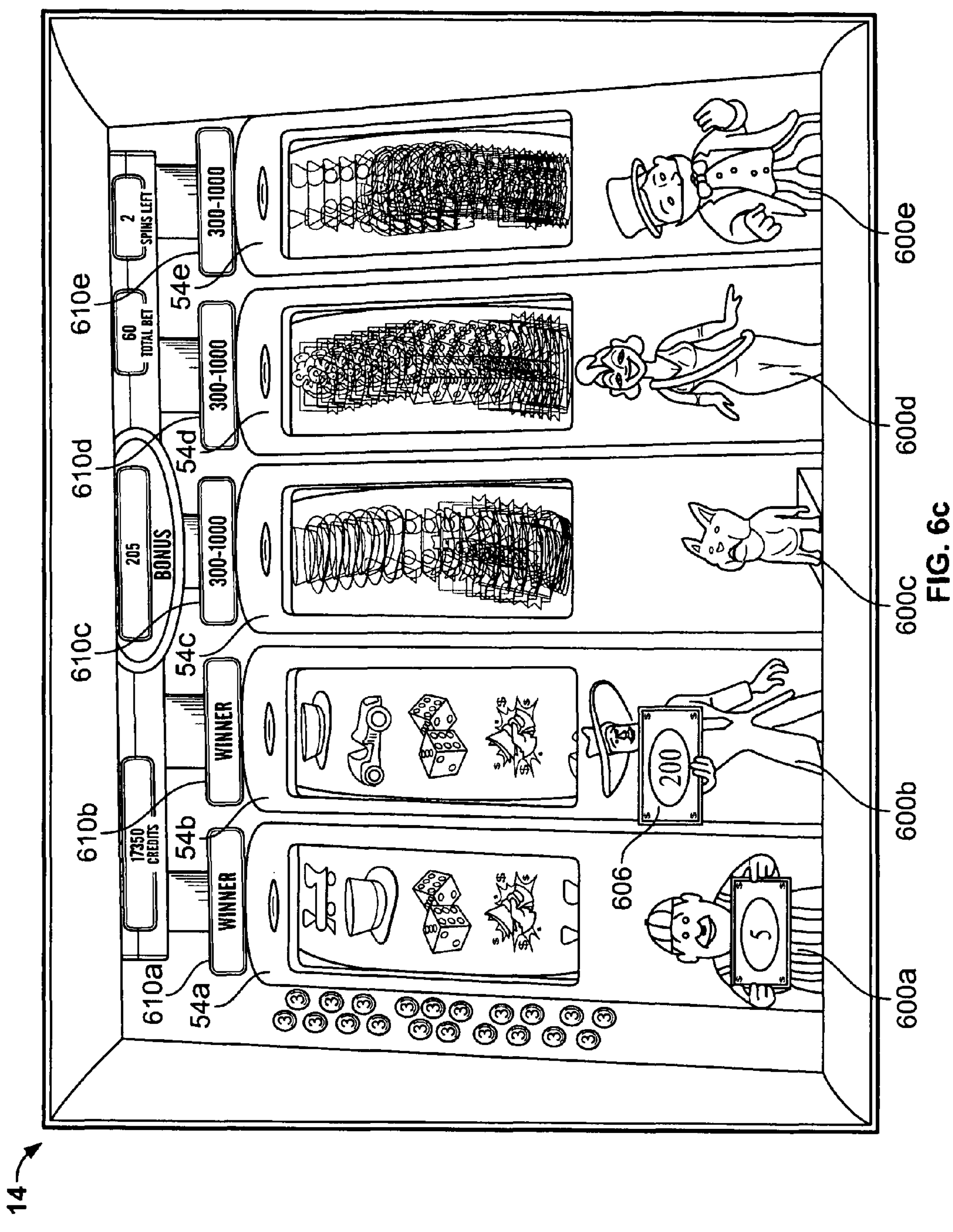
FIG. 6*c* shows the interactive character holding a card representing a randomly selected bonus award.

Referring generally to FIGS. 6*a*-6*c*, a "Money Grab Free Spin" bonus game is displayed on the primary display area 14, which includes the plurality of reels 54*a*-54*e*. The "Money Grab Free Spin" bonus game is triggered in response to a "Chance" triggering condition. Specifically, while the player is conducting a basic wagering game, three or more "Chance" cards land along an active payline to trigger the "Chance" bonus game. The player touches one of the three "Chance" cards to a) reveal a credit award (e.g., 60 credits, 80 credits, or 100 credits), to b) trigger the top box bonus game, or to c) trigger the "Money Grab Free Spin" bonus game.

According to another example, the "Chance" bonus game may be triggered by four "Chance" cards landing along an active payline. The player touches one of the four "Chance" cards to a) trigger the top box bonus game with a multiplier, or to b) trigger the "Money Grab Free Spin" bonus game, with more spins awarded than when three "Chance" cards land along the payline. In yet another example, the "Chance" bonus game may be triggered by five "Chance" cards landing along an active payline. The player touches one of the five "Chance" cards to trigger the "Money Grab Free Spin" bonus game with even more free spins.

If the player touches the "Chance" card associated with the "Money Grab Free Spin" bonus game, the player begins playing the "Money Grab Free Spin" bonus game. After triggering the "Money Grab Free Spin" bonus game, the player plays the plurality of free spins. As stated above, the number of free spins may vary based on the number of "Chance" cards that landed along the payline during the basic wagering game. In general, the more "Chance" cards, the more free spins are awarded. According to one example, the "Money Grab Free Spin" bonus game initially awards 5 spins for three "Chance" cards, 6-9 spins for four "Chance" cards, and 10-15 spins for five "Chance" cards. Optionally, during the free spins, all line pay winning combinations pay at a multiplier (e.g., 3×) and all paylines are active.

During each spin, animated characters are displayed under the reels. When a bonus-award symbol lands on a reel, money fills a money chamber displayed above the character, and the character jumps up (or is sucked up) into the money chamber and grabs a piece of the money.

Referring specifically to FIG. 6*a*, the player is playing a first one of the free spins of the "Money Grab Free Spin" bonus game. The first two reels 54*a*, 54*b* have stopped spinning, while the last three reels 54*c*-54*e* are still spinning. A character 600*a*-600*e* is displayed as a superimposed video image over each reel 54*a*-54*e*, and below the respective reel. In response to a "Money Grab hand" symbol 602 landing in the second reel 54*b*, an animated interaction is initiated for awarding an award to the player. The "Money Grab hand" symbol 602 is shown on the reel 54*b*, i.e., it is not a superimposed video image.

A respective value range for possible awards that may be awarded is indicated in a value range box 610*a*-610*e* above each of the reels 54*a*-54*e*. The value range box 610*a*-610*e* indicates a value range of 10-1000, wherein 10 is the minimum value and 1000 is the maximum value of a currency bill that can be grabbed. Optionally, if an award is won on a particular reel, the value range box 610*a*-610*e* shows a "Winner" text or symbol. For example, a first value range box 610*a* shows a "Winner" symbol above the first reel 54*a*, indicating that an award has already been won in the first reel 54*a*.

The corresponding character 600*a* holds a currency bill that indicates a 5 credit award. It is assumed that prior to the stopping of the second reel 54*b*, the value range boxes 610*a*-610*e* showed a value range of 5-1000 credits. After winning the 5 credit award in the first reel 54*a*, each one of the remaining spinning reels 54*b*-54*e* has changed to a value range of 10-1000 credits in the corresponding value range boxes 610*b*-610*e*. Thus, the lower limit has been increased from 5 credits to 10 credits for each subsequent reel in which a "money grab" event is triggered. The player is likely to get excited by this change, which indicates that the smallest award is now 10 credits, instead of 5 credits.

If the player wins an award on any of the remaining spinning reels 54*b*-54*e*, the player is assured that the smallest award is at least 10 credits. Thus, in this embodiment the lower limit of the credit value range changes to the next higher value of bills relative to the grabbed bill (e.g., changes from 5 credits to 10 credits, because the character of the first reel has grabbed a 5 credit bill, wherein a 10 credit bill is the next higher value after the 5 credit bill). If another bill is won thereafter, the minimum award that can be awarded increases again. Accordingly, if the player wins a large award on the first reel 54*a* (e.g., 500 credits), the player can really win a substantial number of credits if additional "Money Grab hand" symbols 602 land on subsequent reels 54*b*-54*e*. Thus, the range of possible awards changes with each subsequent money grab such that the average value of the changed range is higher than the average value of the previous range. As the average value of the range increases with each "money grab" event, the expected award from each "money grab" event increases.

Referring specifically to FIG. 6*b*, a money chamber 604 appears superimposed over the second reel 54*b*. Numerous superimposed currency bills 606 are floating in the money chamber 604. The bills 606 include, for example, 5s, 10s, 20s, 50s, 100s, 200s, 300s, 500s, and 1000s. The money chamber 604 interacts with the character 600*b*, which is located below the second reel 54*b*, by having the character 600*b* jump up into the money chamber 604. The character 600*b* extends his arms to grab one of many floating currency bills 606. The remaining reels 54*c*-54*e* continue to spin throughout the interaction between the character 600*b* and the money chamber 604.

A "Winner" symbol replaces the 10-1000 value range in the value range box 610*b* of the second reel 54*b*. The value range in the remaining spinning reels 54*c*-54*e* is temporarily replaced by an announcement indicating that the value range is changing, i.e., "Increasing $$$," in accordance with the award that is won in the second reel 54*b*.

Referring specifically to FIG. 6*c*, the character 600*b* is now shown back in his original position, below the second reel 54*b*. The character 600*b* shows the player the currency bill 606 that was grabbed from the money chamber 604, i.e., 200 credits. This is consistent with the certainty that the player would win an award greater than 5 credits. Furthermore, the value range for the remaining spinning reels has changed to 300-1000, because (in accordance with the exemplary embodiment described above) the next higher value of bills 606, after 200 credits, is 300 credits. Thus, the player is now certain that any subsequent grab will result in an award of at least 300 credits. The last three reels 54*c*-54*e* continue to spin throughout the interaction between the character 600*b* and the money chamber 604, and after the character 600*b* shows the grabbed currency bill 606.

If the "Money Grab Free Spin" bonus game is retriggered during the free spins, winning combinations of three or more "Chance" cards award additional free spins. The player picks a "Chance" card to reveal the number of spins award. The amount of additional free spins won is based on the number of triggering "Chance" cards, e.g., three "Chance" cards award 4-6 free spins, four "Chance" cards award 6-9 free spins, and five "Chance" cards award 10-15 free spins.

In alternative embodiments, the value range can change based on other criteria. For example, instead of increasing the lower limit of the value range, the game increases the upper limit of the value range. The upper limit can be increased in addition to increasing the lower limit. In another example, at least one of the lower limit and the upper limit can be decreased. In yet another example, the change can be based on player's winning percentage, time spent on a gaming machine, frequency of play, previous award selection, etc.

In a further example, the value of the lower range can change sequentially to a next higher bill, regardless of the value of the grabbed bill. In other words, regardless of what bill is grabbed by the character, the lower range can change to a next higher value relative to the previous value. Thus, according to this example, if the initial lower range value is 5, the lower range value changes to 10 after a first bill is grabbed, to 20 after a second bill is grabbed, to 50 after a third bill is grabbed, etc. Accordingly, it is irrelevant in this exemplary embodiment whether the first bill has a value of 500, the second bill has a value of 200, and the third bill has a value of 5. The change of the lower range value is not affected by the grabbed bill.

In yet another example, the value range does not change in response to previous "money grab" events, but rather the probability of which bill will be grabbed from the static range is changed to more heavily weigh in favor of grabbing a higher value bill. For example, the bills in the value range may continue to include, for example, 5s, 10s, 20s, 50s, 100s, 200s, 300s, 500s, and 1000s, but a "money grab" event may cause additional bills at the higher end of this range to be added to the money chamber for subsequent "money grab" events. In this way, the expected award from each "money grab" event increases without changing the value range.

The range values may remain in their changed (or modified) condition until a resetting condition occurs to reset the range values back to their default values. For example, the resetting condition may be the end of a reel spin, i.e., when all the reels have stopped spinning. As such, each free spin may start with a default value range (e.g., 5-1000). In another example, the modified range may last until the player has used all the free spins of a bonus game.

Figure 7A:
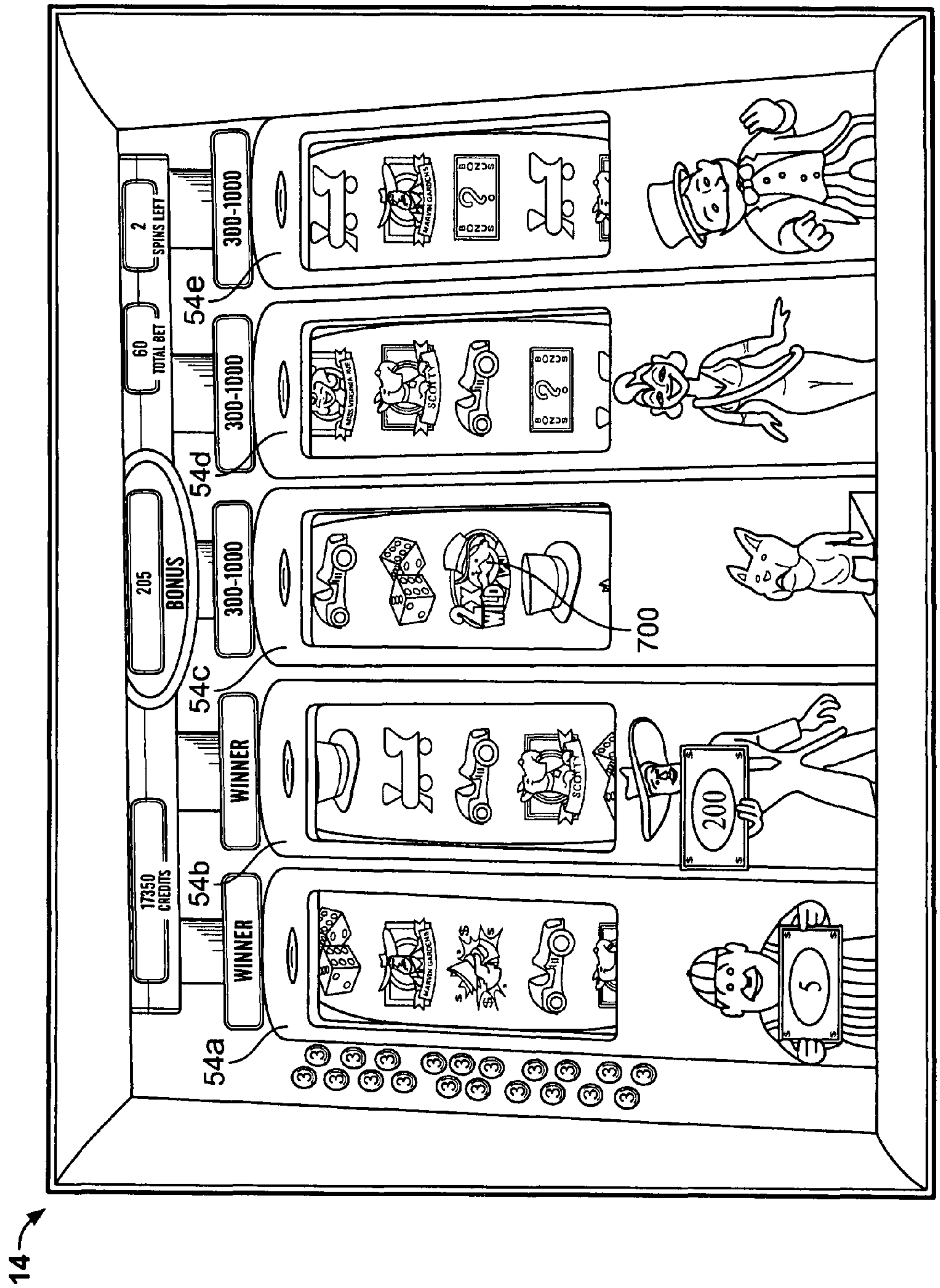
FIG. 7*a* is a game-display representation showing a "2× Wild" special symbol on a third reel.
Figure 7B:
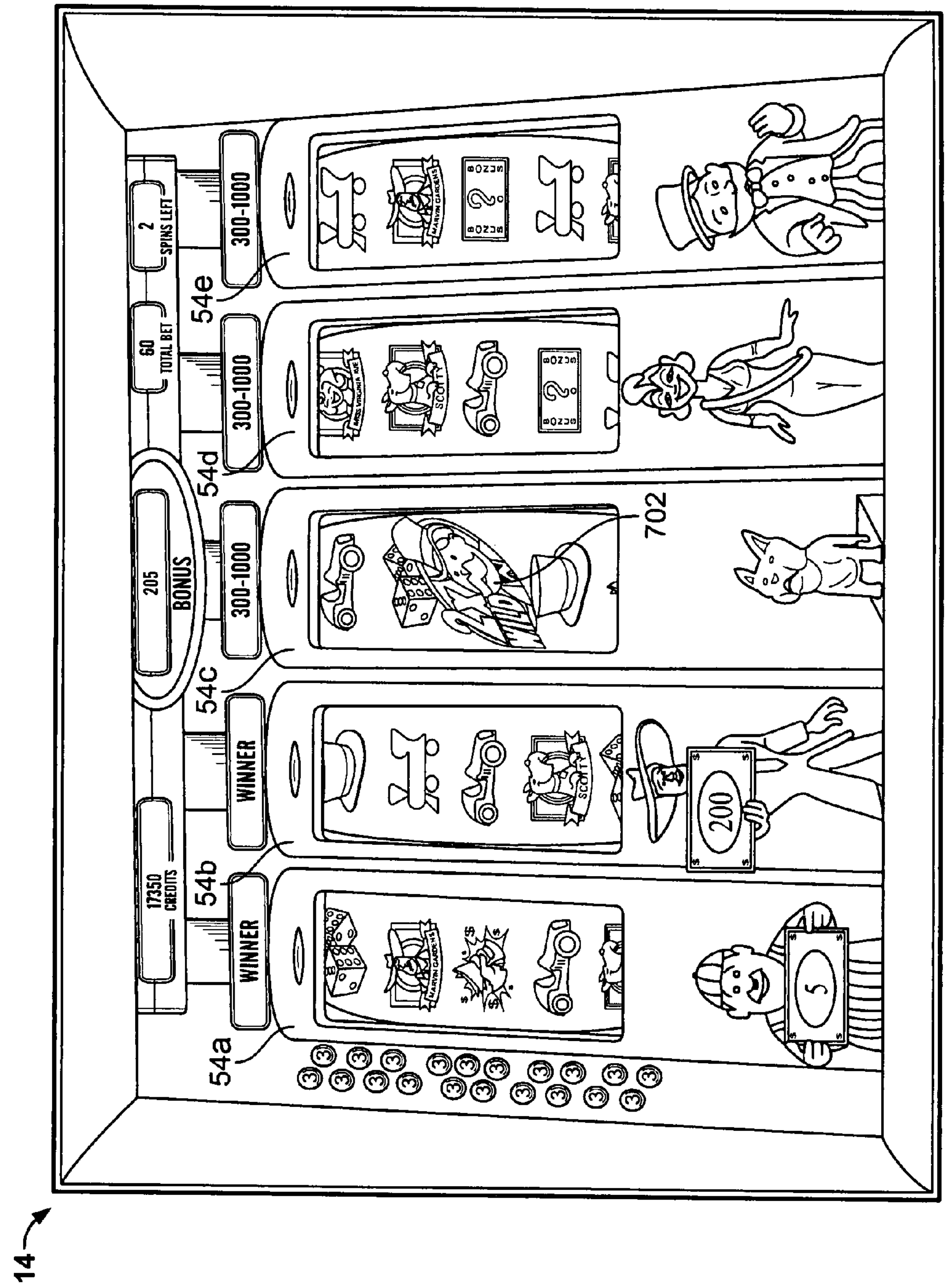
FIG. 7*b* shows the appearance of the "2× Wild" special symbol being lifted from the third reel.
Figure 7C:
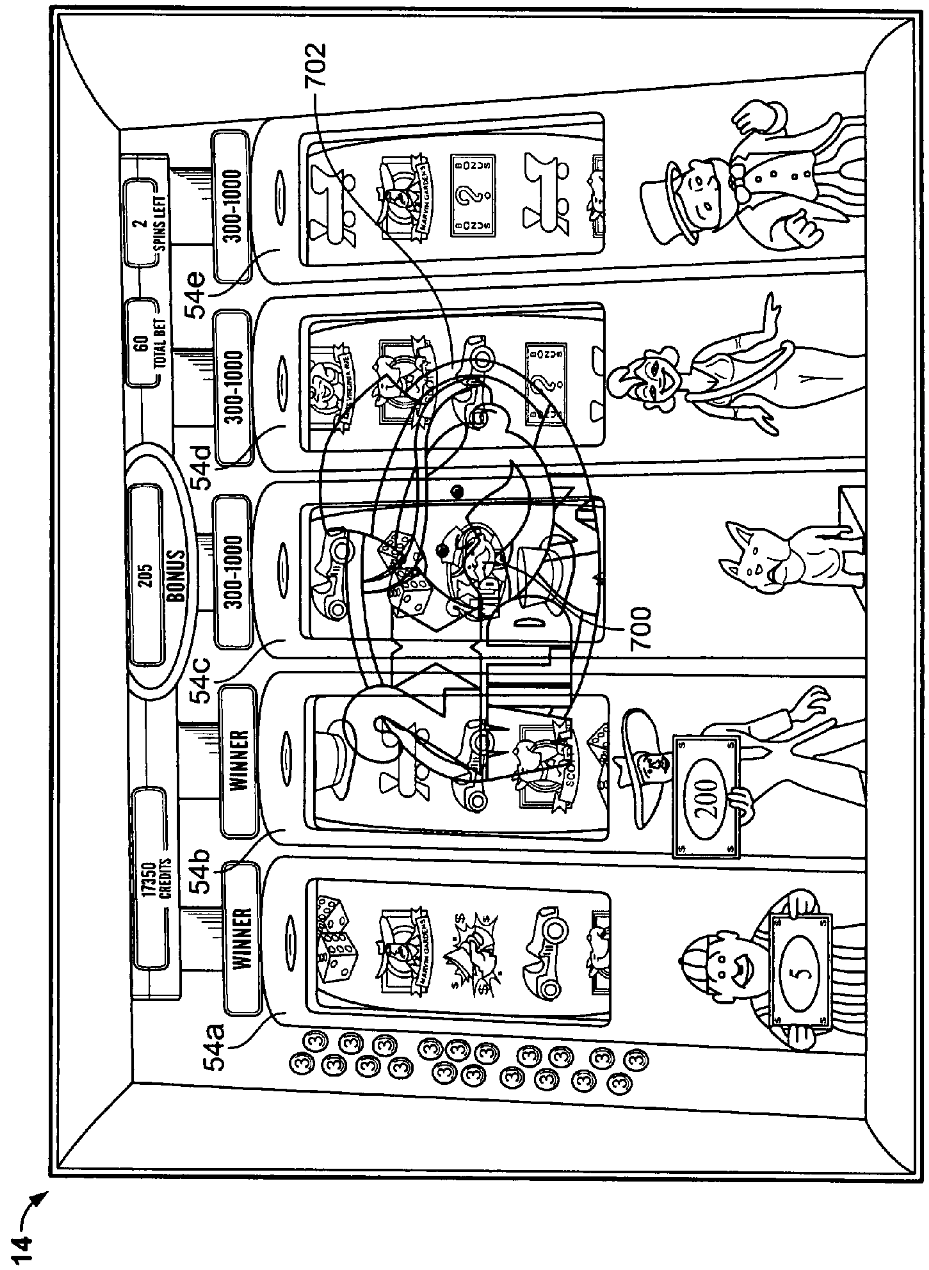
FIG. 7*c* shows the "2× Wild" special symbol superimposed over a number of reels for greater emphasis.

Referring generally to FIGS. 7*a*-7*c*, a symbol appearing on a reel is emphasized by showing a superimposed form of the symbol on a superimposed video display (e.g., a transmissive display) of the primary display area 14. Specifically, in FIG. 7*a* a 2× Wild symbol 700 lands on the third reel 54*c* of the plurality of reels 54*a*-54*e*. The 2× Wild symbol 700 is not a superimposed video image. Because the 2× Wild symbol 700 is likely to excite the player, the 2× Wild symbol 700 will be emphasized for easy recognition.

In FIG. 7*b*, a superimposed form 702 of the 2× Wild symbol 700 gives the appearance that the 2× Wild symbol 700 increases in size as it rotates away from the underlying screen (e.g., away from a mechanical reel) and toward the player. Eventually, in FIG. 7*c*, the superimposed form 702 is shown superimposed, and in greater size, over the underlying (e.g., mechanical) 2× Wild symbol 700.

In alternative embodiments, the superimposed form 702 of the underlying symbol 700 can change in shape, color, illumination, etc. For example, the superimposed form 702 can have the same size as the underlying symbol 700 but it can have a brighter color. Further, various animations can be used to illustrate the emphasis of the underlying symbol 700. For example, the superimposed form 702 can move around the screen randomly, from the location of the underlying symbol 700, until it stops at its initial starting point (the location of the underlying symbol 700).

Each of these embodiments and obvious variations thereof is contemplated as falling within the spirit and scope of the claimed invention, which is set forth in the following claims.

What is claimed is:

1. A gaming machine for playing a wagering game, comprising:

an input device for receiving a wager to play a single play of the wagering game;

at least one display device operable to display a plurality of spinning reels including a first reel and a second reel, the plurality of spinning reels including a plurality of symbols for indicating a randomly selected outcome, the plurality of symbols including at least a first special award symbol and a second special award symbol, and a plurality of award ranges including a first range and a second range, the first range corresponding to and being displayed adjacent to the first reel, the second range corresponding to and being displayed adjacent to the second reel, the first range having a first average value for a first award and the second range having a second average value for a second award, the second average value having a default value and a modified value, the second range having the default value being initially displayed; and a controller in communication with the display device and programmable to cause the plurality of spinning reels to spin and stop in succession for displaying the single play of the wagering game, the first reel stopping before the second reel within the single play of the wagering game, in response to the first reel displaying the first special award symbol, (i) provide the first award randomly selected from the first range, and (ii) display the second range having the modified value, in response to the first reel not displaying the first special award symbol, (iii) continue to display the second range having the default value, and subsequent to the first award being randomly selected from the first range and in response to the second reel displaying the second special award symbol, provide the second award randomly selected from the second range, the modified value of the second range being greater than the first average value of the first range.

2. The gaming machine of claim 1, wherein the second range includes a plurality of possible awards ranging from a lowest possible award to a highest possible award, the modified value of the second average value being determined by modifying at least one of the lowest possible award and the highest possible award.

3. The gaming machine of claim 1, wherein the second range includes a plurality of possible awards ranging from a lowest possible award to a highest possible award, the modified value of the second average value being determined by modifying a probability of selecting different ones of the possible awards.

4. The gaming machine of claim 1, wherein the display device is further operable to display a bonus-award animation associated with at least one of the first special award symbol and the second special award symbol, any successive reels of the plurality of spinning reels continuing to spin during the displaying of the bonus-award animation on a stopped reel of the plurality of spinning reels.

5. A method of conducting a wagering game, the method comprising:

receiving a wager input, via an input device, from a player for playing a single play of the wagering game;

displaying on at least one display device a plurality of spinning reels including a first reel and a second reel, the plurality of spinning reels including a plurality of symbols for indicating a randomly selected outcome, the plurality of symbols including at least a first special award symbol and a second special award symbol;

displaying on the at least one display device a plurality of award ranges including a first range and a second range, the first range corresponding to and being displayed adjacent to the first reel, the second range corresponding to and being displayed adjacent to the second reel, the first range having a first average value for a first award and the second range having a second average value for a second award, the second average value having a default value and a modified value, the second range having the default value being initially displayed;

using one or more controllers to cause the plurality of spinning reels to spin and stop in succession for displaying the single play of the wagering game, the first reel stopping before the second reel within the single play of the wagering game;

in response to the first reel displaying the first special award symbol, using at least one of the controllers for (i) providing and randomly selecting the first award from the first range, and (ii) displaying the second range having the modified value;

in response to the first reel not displaying the first special award symbol, (iii) continuing to display the second range having the default value; and subsequent to the first award being randomly selected from the first range and in response to the second reel displaying the second special award symbol, using at least one of the controllers for providing and randomly selecting the second award from the second range, the modified value of the second range being greater than the first average value of the first range.

6. The method of claim 5, further comprising increasing a low-range value of the second average value to a value higher than the value of the first award.

7. The method of claim 5, further comprising determining the modified value of the second average value by modifying at least one of a lowest possible award and a highest possible award associated with the second range.

8. The method of claim 5, further comprising determining the modified value of the second average value by modifying a probability of selecting different ones of a plurality of possible awards associated with the second range.

9. The method of claim 5, further comprising displaying on the display device a bonus-award animation associated with at least one of the first special award symbol and the second special award symbol, any successive reels of the plurality of spinning reels continuing to spin during the displaying of the bonus-award animation on a stopped reel of the plurality of spinning reels.

10. The method of claim 5, further comprising increasing a lowest possible award of the second range to a next higher possible award of a plurality of possible awards associated with the second range.

11. The method of claim 5, further comprising conducting a bonus game in response to the randomly selected outcome being a start-bonus outcome.

12. A method of conducting a wagering game, the method comprising:

receiving a wager input, via an input device, from a player for playing a single play of the wagering game; using one or more controllers for randomly selecting an outcome from a plurality of outcomes; displaying on at least one display device a plurality of symbols arranged on a plurality of reels for indicating the outcome, the plurality of symbols including one or more special award symbols; displaying on the at least one display device a plurality of award ranges corresponding to the plurality of reels, each of the plurality of award ranges being displayed adjacent to a corresponding one of the plurality of reels, each of the plurality of award ranges having an average default value for a default award, at least one of the plurality of award ranges having an average modified value for a modified award, the average modified value being greater than the average default value, the ranges having the average default value being initially displayed;

using one or more controllers to cause the plurality of reels to spin and stop in succession for displaying the single play of the wagering game;

in response to one of the plurality of reels stopping and displaying one of the special award symbols, using at least one of the controllers for randomly selecting the default award from an award range of the plurality of award ranges that corresponds to the one of the plurality of reels, in response to the one of the plurality of reels displaying the one of the special award symbols, using at least one of the controllers for displaying the range having the average modified value for one or more of remaining ones of the plurality of reels;

in response to not displaying the one of the special award symbols, continuing to display the range having the average default value for one or more of the remaining ones of the plurality of reels; and subsequent to the default award being randomly selected and in response to another one of the plurality of reels displaying another one of the special award symbols, using at least one of the controllers for randomly selecting the modified award from another award range of the plurality of award ranges.

13. The method of claim 12, further comprising increasing a low-range value of the average modified value to a value higher than the value of the default award.

14. The method of claim 12, further comprising determining the average modified value by modifying at least one of a lowest possible award and a highest possible award associated with the at least one of the plurality of award ranges.

15. The method of claim 12, further comprising determining the average modified value by modifying a probability of selecting different ones of a plurality of possible awards associated with the at least one of the plurality of award ranges.

16. The method of claim 12, further comprising displaying on the at least one display device a bonus-award animation associated with at least one of the special award symbols, any successive reels of the plurality of reels continuing to spin during the displaying of the bonus-award animation on a stopped reel of the plurality of reels.

17. The method of claim 12, further comprising conducting a bonus game in response to the outcome being a start-bonus outcome.

* * * * *